Sept. 22, 1959    H. M. ZENOR    2,904,956
ACTUATING DEVICE
Filed March 28, 1955    5 Sheets-Sheet 1
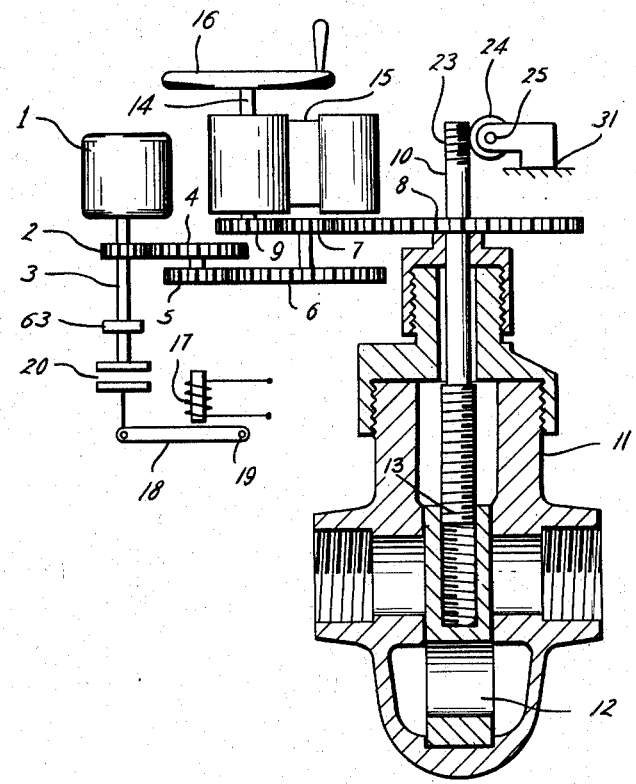
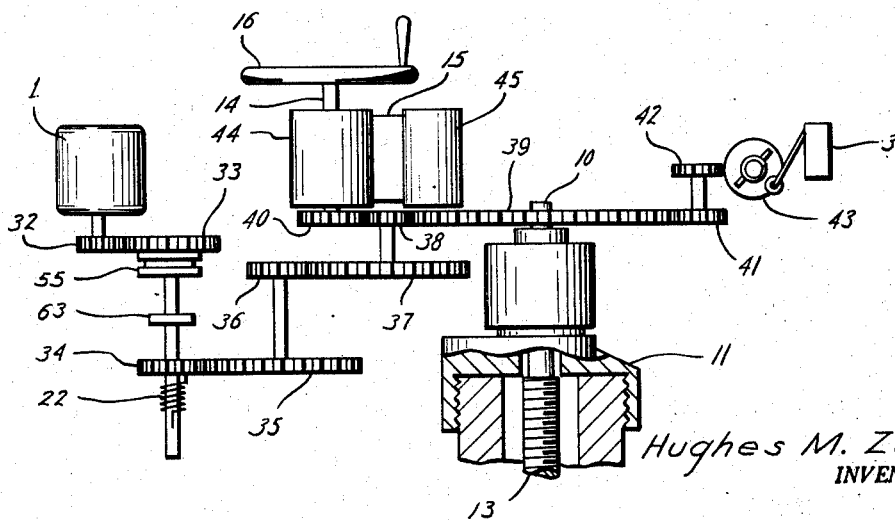
Hughes M. Zenor
INVENTOR.
BY
Murray Robinson
ATTORNEY Sept. 22, 1959     H. M. ZENOR     2,904,956
ACTUATING DEVICE
Filed March 28, 1955     5 Sheets-Sheet 2
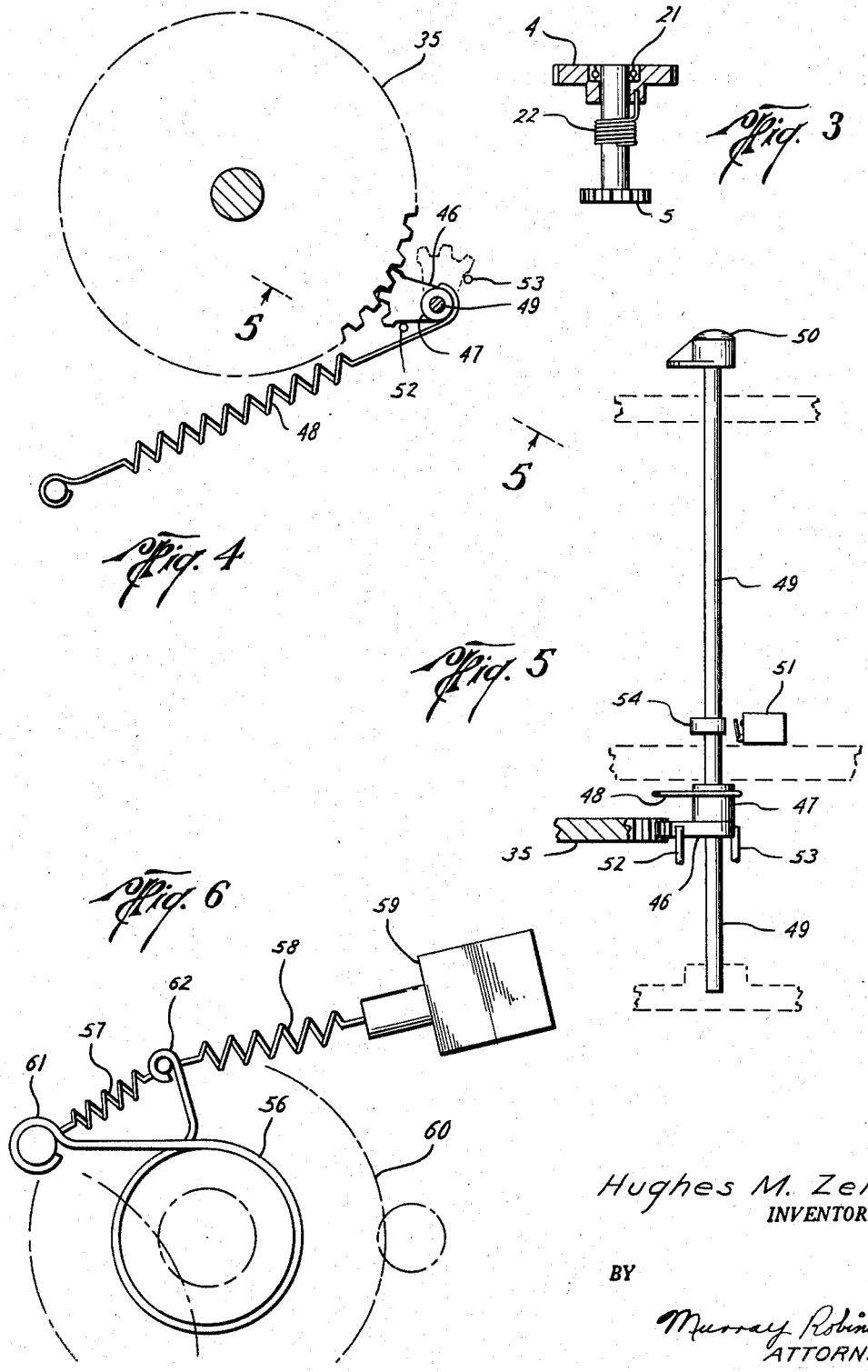
Hughes M. Zenor
INVENTOR.
BY
Murray Robinson
ATTORNEY Sept. 22, 1959  H. M. ZENOR  2,904,956
ACTUATING DEVICE Filed March 28, 1955  5 Sheets-Sheet 3

Hughes M. Zenor
INVENTOR.

BY Murray Robinson

ATTORNEY

Sept. 22, 1959 H. M. ZENOR 2,904,956
ACTUATING DEVICE
Filed March 28, 1955 5 Sheets-Sheet 4

Hughes M. Zenor
INVENTOR.

BY Murray Robinson

ATTORNEY

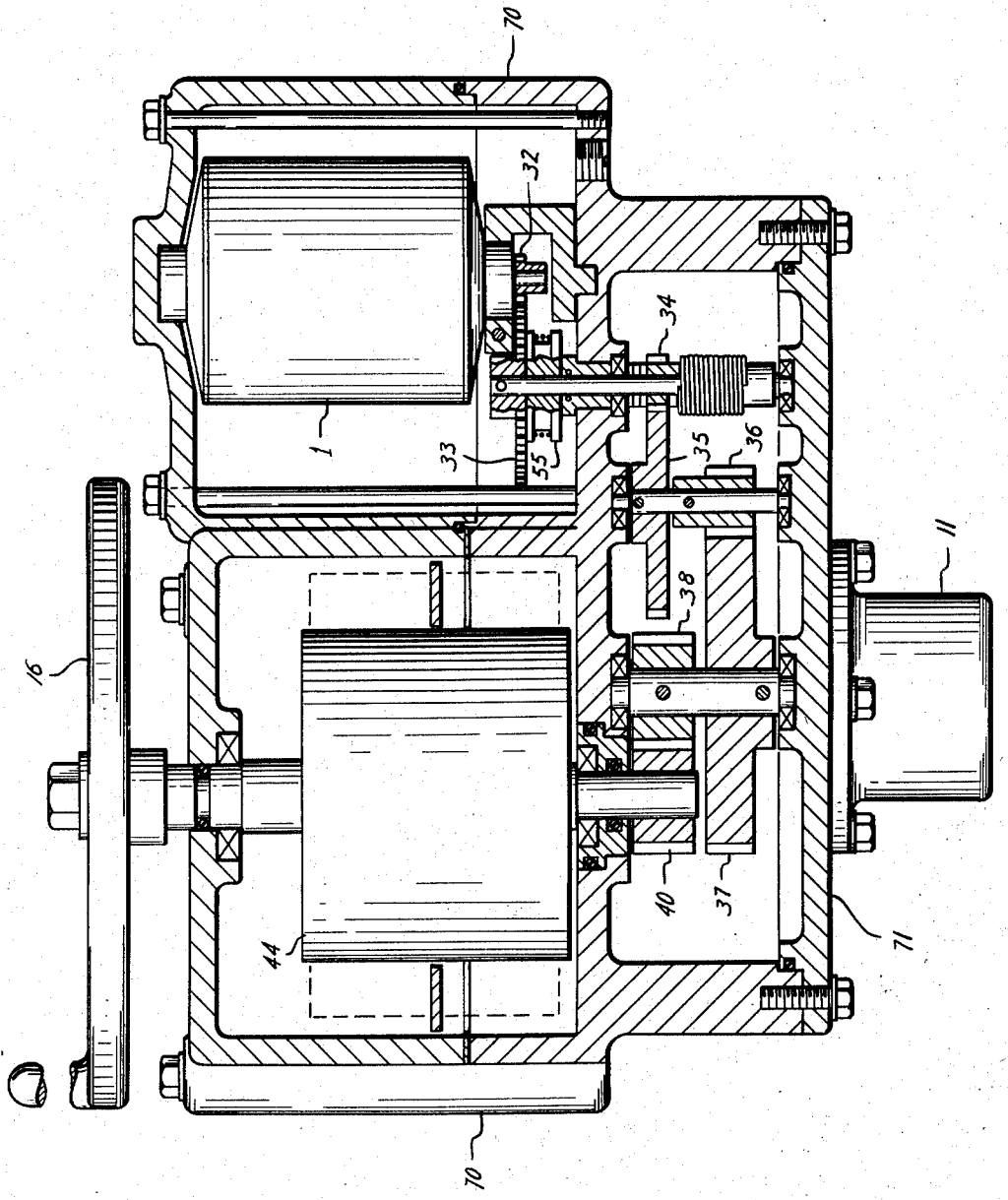

United States Patent Office 2,904,956
Patented Sept. 22, 1959

2,904,956

ACTUATING DEVICE

Hughes M. Zenor, Tulsa, Okla., assignor to McEvoy Company, Houston, Tex., a corporation of Texas Application March 28, 1955, Serial No. 497,017

4 Claims. (Cl. 60—7)

This invention relates to a control operator, especially a valve operator, that is, a device for opening and closing valves. More particularly, this invention relates to a valve operator in which a motor for example an electric motor, opens the valve and a spring actuated device, for example a spring motor, closes the valve. Obviously, the operator may be altered so that the electric motor closes the valve and the spring motor opens the valve without departing from the spirit and objects of the invention.

The object of this invention is to provide an apparatus for opening or closing a valve or valves by means of a motor drive, and for correspondingly closing or opening the valve by means of a spring actuated device. Any type of motor drive may be used, including electric motors, gas motors, gasoline motors, hydraulic motors, and in fact, any of the motor drives known in the art may be used. The spring actuated device is used to store energy during compression of the spring, and other means may be used in place of the spring actuated device, such as, hydraulic devices, pneumatic devices, compression devices, electrically actuated devices, and in fact, any means capable of storing and subsequently discharging energy may be used. In the preferred form of the invention a "Neg'ator" Type "B" (Hunter Spring Company) spring motor is used. In addition, means such as brakes, clutches, recoils, cut-offs, switches, cushions, shock-absorbers, and the like may be used in the apparatus.

A further object of this invention is to provide a valve operator for opening a valve full open and to close the valve full closed. However, the operator may be designed to operate a valve between any two or more points between the full open and full closed positions as well as at the full open and the full closed positions.

A further object of this invention is to provide a valve operator for opening and closing valves which may be operated from a distance or from a point remote from the valve as well as at the valve.

A further object of this invention is to provide an apparatus for opening and closing valves which will close the valve or which will open the valve in case of a power failure or other emergency, thus limiting fire hazards and the loss of valuable materials.

Briefly, the apparatus in one of its forms comprises a motor drive geared to a valve shaft or stem, a spring actuated device also geared to the valve shaft or stem, the motor being operable to open or to close the valve, and the spring actuated device being operable correspondingly to close or to open the valve. The motor drive may be, and preferably is, also geared to the spring actuated device. In place of gears, other means for transmitting power may be used, including chain and belt means and other means known in the art. Means may be provided for operating the valve manually or by hand.

Figure 1 is a side view of one embodiment of the invention, shown partly in section.

Figure 2 is a side view of a preferred embodiment of the invention, shown partly in section.

Figure 3 is an elevation showing an overriding clutch as used in the invention.

Figure 4 is a plan view of a manual locking device.

Figure 5 is a section on line 5—5 of Figure 4.

Figure 6 is a plan view of a solenoid-operated spring brake.

Figure 9 is a section on line 9—9 of Figure 7.

Figure 7:
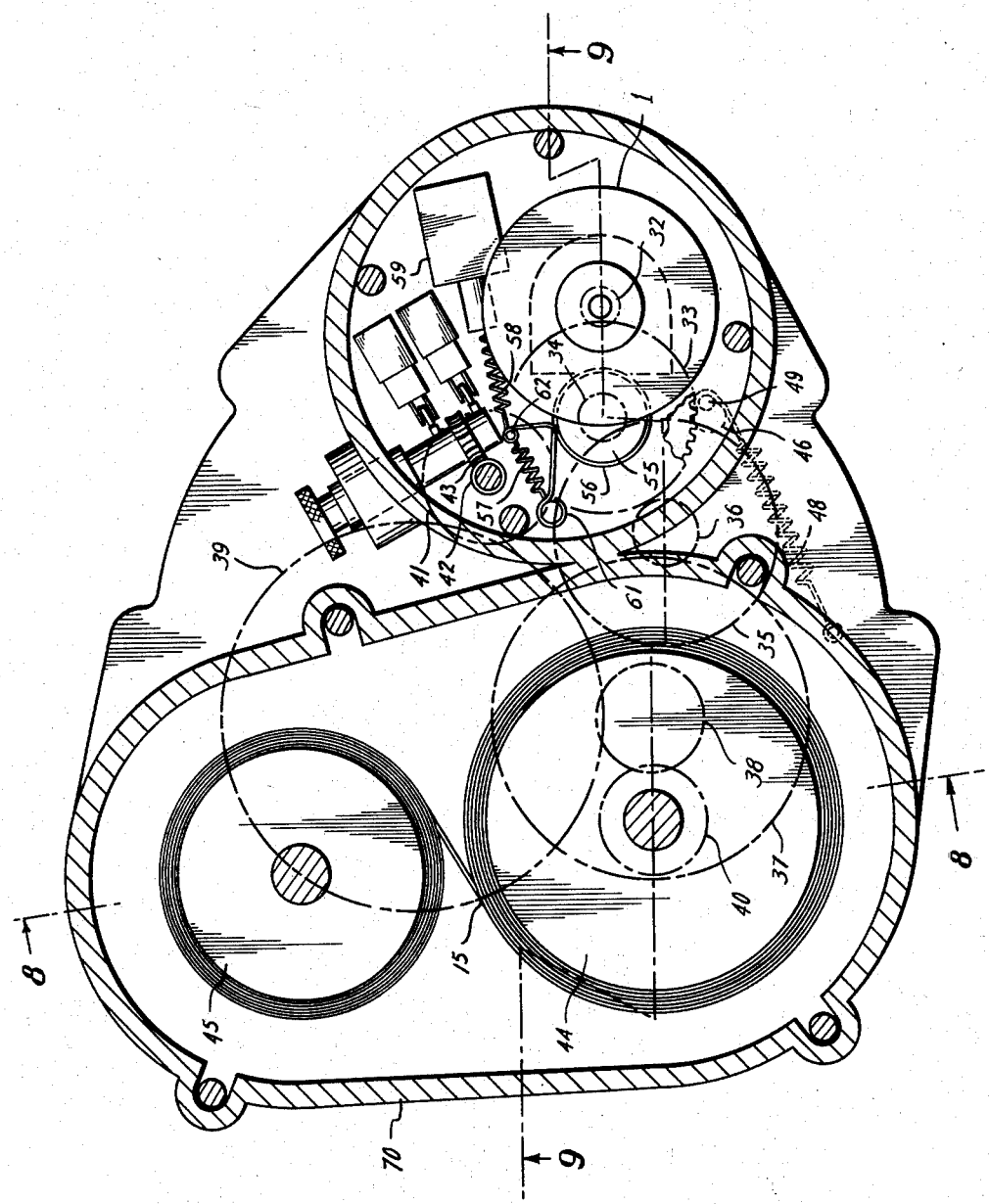
Figure 7 is a sectional plan view of one assembly arrangement of the embodiment of the invention shown in Figure 2.

The following detailed description refers to the form of the invention shown in Figure 1 of the drawings. Reference numeral 1 refers to a motor used to drive gear 2 through shaft 3. Gear 2 motivates a gear train comprising gears 4, 5, 6, 7, 8, and 9. Gear 8 is rigidly fastened to screw 10 of valve 11 by means of a spline or a key, not shown. A square hole in gear 8 may be slipped over the square provided on screw 10 which is normally used for the hand wheel so that standard screws made for mechanically or hand operated valves may be used with the apparatus. Valve 11 may be any type of valve operated by a screw or shaft which rotates but which does not move longitudinally during operation of the valve. In the valve shown, when screw 10 is rotated, gate 12 is raised or lowered and the valve is opened or closed. Gate 12 is moved by means of thread 13 on screw 10. Gear 9 is rigidly fastened to shaft 14 of spring motor 15. Handwheel 16 is likewise rigidly fastened to shaft 14 above spring motor 15. When motor 1 is operating in a manner so as to open valve 11, shaft 14 rotates and energy is stored in spring motor 15. This energy may be later used to rotate the gear train and the valve screw 10 in the opposite direction to close the valve. In case the motor 1 were used to close the valve, then the energy stored in spring motor 15 would be used to open the valve.

Brake means, also shown in Figure 1 of the drawings, may be provided for holding the valve in an open or closed position when motor 1 is not operating. Referring to the drawing, solenoid 17 when energized exerts an upward force on bar 18 pivoted at 19 and applies brake 20 at the lower end of shaft 3. The brake may appropriately be made to operate after motor 1 has opened valve 11 and has stored energy in spring motor 15. Current may then be supplied to solenoid 17 instead of to motor 1 by any convenient circuit arrangement. Brake 20 will hold the valve open until the current to solenoid 17 is cut off, at which time spring motor 15 will close the valve.

Figure 3 shows a spring clutch or "Cat-head" clutch which may be provided in order that after spring motor 15 has closed the valve 11, motor 1 may freewheel until its momentum has dissipated and shaft 3 may be relieved of the shock which would occur if motor 1 were abruptly stopped when valve 11 suddenly reaches the closed position. If the closure time is very short, motor 1, being directly geared to the spring, will be rotating very fast and the normal provisions for preventing damage to the system on opening may not be sufficient to prevent damage to the mechanism when the valve strikes the lower mechanical stop. Since the valve closes when power is removed from the unit, there is no limit switch to stop the motor prior to its striking a mechanical stop. The use of limit switches will be described below. To prevent damage to the mechanism, particularly damage to shaft 3, an overriding spring clutch is provided on the shaft of gear 4. This overriding clutch is unidirectional in that when the motor 1 is opening the valve 11, positive drive will be obtained through the gear train. When the valve 11 is closed by spring motor 15, positive drive will be obtained through the gear train so long as the motor 1 is turning slower than it would if it were directly connected. When motor 1 is turning faster than is the case when the motor is directly connected, the overriding clutch slips; thus when the valve gate reaches full close and its travel is mechanically stopped, the motor 1 will continue to rotate until it coasts to a stop, since the overriding clutch will slip and disconnect the motor from the gear train. One type of overriding clutch which may be used is shown in Figure 3. Gear 4 is connected to its shaft by means of a bearing 21, for example a ball or roller bearing, so that gear 4 is free to rotate on the shaft. One end of a coil spring 22 is rigidly connected to gear 4. The spring 22 is wound about the shaft. The other end of spring 22 is not connected to either a gear or the shaft. Spring 22 is wound so that its internal diameter is slightly smaller than the diameter of the shaft. This clutch has unidirectional power transmission in that when gear 4 is turning counter clockwise relative to the shaft the friction on the lower end of the spring will tend to wind the spring tight on the shaft, giving positive transmission of power. When the gear is turning clockwise relative to the shaft, the spring will tend to unwind and to loosen on the shaft, giving negligible power transmission. Thus the inertia effect of the motor which is amplified by the square of the gear ratio, is prohibited from doing damage to the valve, shafts, and mechanism when the valve strikes the lower mechanical stop in closing. Similar clutches may be provided at other points in the gear train to reduce shock when the valve opens or closes and may also be provided in other forms of the invention such as the form shown in Figure 2, where the clutch is indicated by reference numeral 22.

Figure 1 also shows a limit switch mechanism which may be provided in the valve operator. In some installations it is necessary that the motor move the valve to a fixed stop. Some worm gears and screws have a tendency to lock or freeze if the full motor driving power is available when the valve moves against the stop. It is possible that when the motor is reversed, the motor will not be able to move the gear or screw after it has been locked or frozen. Two solutions are available for this problem. One solution is to provide a limit switch 31 which will be actuated just before the valve stem is mechanically stopped so as to give reduced power to the motor on its final approach to the mechanical stop; thus the locking tendency will be reduced, and by use of normal power the motor may be reversed. Another solution is to provide proper switching so that increased power may be used for moving the stem away from the stop than is used when the stem approaches the stop. In Figure 1, threads 23 on screw 10 drives worm gear 24. On shaft 25 on which is mounted worm gear 24 are a series of cams which are used to actuate limit switch 31 and other control switches. Instead of cams, protruding pins may be used to actuate the switches. The cams or pins are made so that they may be moved on shaft 25 and then fastened with a set screw or other device so that the point of actuation of the switches may be adjusted. That is, depending on the location in which the valve operator may be installed, it might be desirable to have the point of actuation of the switches adjusted so that the valve will operate between full-open and full-closed, or between full-open and partly closed, or between partly open and full-closed, or between any other positions between full-open and full-closed. Other modifications of the switching arrangement or limit switch mechanism will be apparent to those skilled in the art.

An alternative to using a limit switch mechanism, such as is described above, is to disconnect the motor electrically when the valve has reached a mechanical stop by placing an overload relay in series with the motor. It is known that a motor draws more current when a heavy load is placed on the motor or when the motor is stalled. Thus, by placing the above mentioned relay in series with the motor, the motor will be disconnected when the valve has reached a mechanical stop stalling the motor. It is possible to limit the possibility of operation of this relay during the normal travel of the valve when, due to abnormal conditions, the valve requires more force than normal, by placing a limit switch to be actuated near the end of travel. This limit switch would disconnect the relay for all positions other than the end points, allowing it to actuate after the limit switch has been actuated and when the valve reaches a fixed mechanical stop.

Handwheel 16, Figure 1 of the drawings, is provided for operating the valve when the power to motor 1 has been turned off or is otherwise not available. Valve screw 10 has a left hand thread so that the handwheel 16 may turn clockwise for closing the valve and counter-clockwise for opening the valve in the same way that the handwheel would turn if it were attached to the top of screw 10. The handwheel 16 is given mechanical advantage by the gear arrangement since in manual opening of the valve the operator not only has to apply sufficient torque to open the valve but also sufficient torque to wind the spring. The force required to wind the spring is greater than that required to normally open the valve since the torque available from the spring to close the valve must be sufficient to close the valve under adverse conditions.

Figure 8:
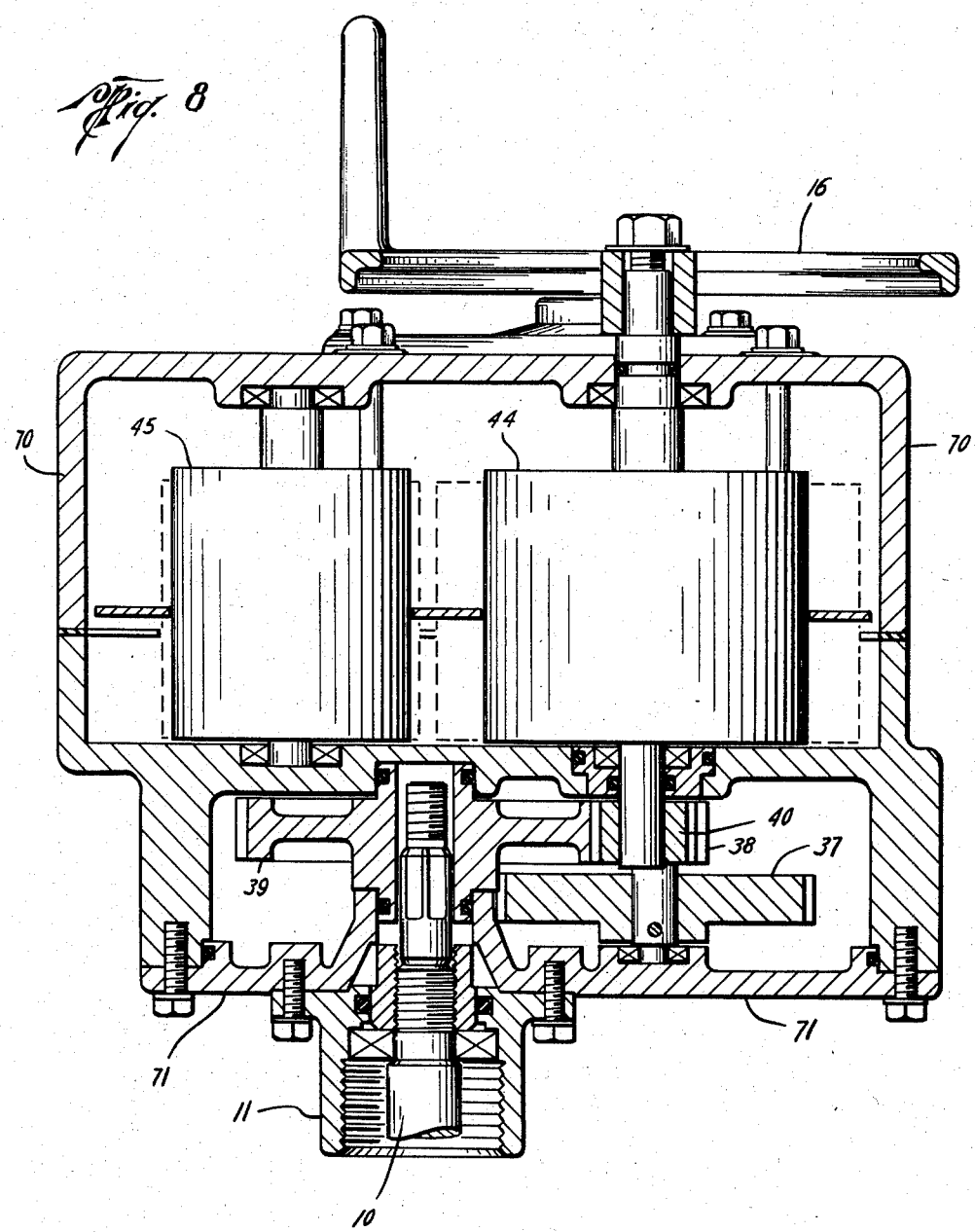
Figure 8 is a section on line 8—8 of Figure 7.

Figure 2 of the drawings shows a preferred form of the valve operator. Motor 1 is geared to valve screw 10 through gear trains 32, 33, 34, 35, 36, 37, 38 and 39. The valve 11 opens when gear 39 and screw 10 are rotated counter clockwise. The valve 11 closes when gear 39 and screw 10 are rotated clockwise. Spring motor 15, which operates from gears 38 and 40 of the gear train, stores energy for later closing valve 11, or in some cases for later opening valve 11. Spring motor 15 is a "Neg'ator" Type "B" spring motor such as is manufactured by the Hunter Spring Company of Lansdale, Pennsylvania, in this preferred form of the invention. Two or more of these motors may be provided to operate in parallel as shown in Figs. 8 and 9, which show the assembly of the form of the invention of Fig. 2. This type of spring motor delivers a substantially constant torque during the power delivering period of its operation. No invention is claimed as to the spring motor itself, but the patentable novelty rests in its use in the valve operator, since by the use of the "Neg'ator" Type "B" spring motor in the valve operator a very superior operation results as compared to the operation which results when other types of spring motors are used. The valve is closed, or opened, very smoothly and at a very constant speed by the "Neg'ator" spring motor. The "Neg'ator" spring motor delivers adequate power to insure that the valve operator will function properly when necessary. Briefly, the "Neg'ator" spring motor comprises a spring storage bushing or spindle 45, a spring working bushing or spindle 44, a strip of flat spring material 15 which has been given a curvature by continuous heavy forming so that in its relaxed or unstressed condition the strip is in the form of a tightly wound spiral about the spring storage bushing 45, said strip spiral having its outside end withdrawn from the spiral and fastened to the spring working bushing 44, said strip spiral having its inside end fastened to the spring storage bushing 44, and said spring working bushing being mounted on a shaft 14 through which the strip may be unwound from the spring storage bushing and wound backward onto the spring working bushing, said shaft also being used to deliver the power stored in the spring wound on the spring working bushing to gear 40 of the gear train. In operation, the spring 15 is unwound from the spring storage bushing 45 and back-wound on the spring working bushing 44 by the motor 1 while it is opening the valve 11. The spring strip is back-bent in passing from the spring storage bushing to the spring working bushing, and the back winding and back-bending cause the spring strip to be in an unrelaxed or stressed condition on the spring working bushing. When brake 20 or brake 55 which holds the valve 11 open is released, the spring strip rewinds into the relaxed spiral on the spring storage bushing and gives rotational power to the shaft 14 on which the spring working bushing is mounted to close the valve through the gear train.

Figures 4 and 5 of the drawings show a manual lock mechanism which may be conveniently installed to control gear 35 of the gear train of Figure 2, or gear 4 of the gear train of Figure 1. In the mechanism shown, sector gear 46 mounted on hub 47 and shaft 49 may be turned counter clockwise by means of knob 50 so that sector gear 46 meshes with gear 35 and is stopped by stop 52, thus locking gear 35 so that it will not rotate in a clockwise direction. Spring 48 holds sector gear 46 away from gear 35 and in contact with stop 53 when the manual lock is not in use. A cam or a pin, indicated by reference numeral 54 of Figure 5, is attached to shaft 49. The cam or pin 54 actuates a switch 51 so that when the manual lock mechanism is holding the valve open and power is applied to motor 1, motor 1 will turn gear 35 counter clockwise until sector gear 46 is free of gear 35, at which time spring 48 will move sector gear 46 against stop 53. Cam or pin 54 is adjusted so that switch 51 is not closed until sector gear 46 has positively engaged gear 35.

Another type of brake may be used in place of the brake 20 which is shown in Figure 1. Figure 6 shows a spring brake which may be used in any of the modifications of the invention, including those of Figure 1 and Figure 2. The brake shown in Figure 6 is indicated at 55 in Figure 2, where it is located adjacent to gear 33. In Figure 6, spiral spring 56 encircles a brake drum 60 provided on a gear shaft. Spring end 62 is attached to a brake pull spring 58 which is attached to a solenoid 59, as shown. Brake release spring 57 is attached between the two spring ends 61 and 62. Spring end 61 is rigidly attached to the frame or housing of the valve operator. When power is supplied to solenoid 59, spring end 62 is pulled toward solenoid 59 by pull spring 58 and spiral spring 56 is tightened on brake drums 60, thus tending to brake the shaft. When power is withdrawn from solenoid 59, spring 57 pulls spring end 62 toward spring end 61, thus releasing the brake. The brake may be positioned on any convenient shaft in the gear train. Ordinarily, spiral spring 56 will have several turns about the brake drum.

The time required for opening the valve may be controlled by controlling the speed of motor 1. In order that the time required for closing the valve may be controlled, a governor 63 may be provided on the motor shaft and on one of the counter shafts so as to limit the closing time to a predetermined value. The governor may be provided in any of the forms of the invention.

Figures 7, 8 and 9 show the assembly of the valve operator in the form already described in connection with Figure 2. The motor 1, gear train 32 to 40, spring motor 15, and other elements of the assembly are located inside a cast housing or cover 70 having cover plate 71, as shown. The reference numerals in Figures 7, 8, and 9 correspond to those in Figures 1–7, wherever the elements are the same. Figure 8 is taken at section 8—8 of Figure 7 and Figure 9 is taken at section 9—9 of Figure 7. By enclosing the controller in housing 70, the parts are kept clean and in good operating condition so that dependable operation may be had over a long period of time without servicing, and even though the operator is installed at a point distant from the control point. The operator is compact and neat in appearance and is readily installed as a single unit at any desired location.

A number of electrical circuits may be used in conjunction with the controller. A circuit which is useful when a split phase motor is used has a limit switch in series with the motor winding and has the brake solenoid winding in parallel with the motor winding and in series with the limit switch. When the motor is operating and opening the valve the brake circuit is open. When the valve reaches the full open position, the motor circuit is opened by the limit switch and the brake circuit is simultaneously closed by the limit switch, holding the valve open as long as power is applied to the circuit. When power is removed from the operator circuit, the brake is released and the spring motor closes the valve. The manual locking device circuit is placed to bypass the limit switch so that when power is applied to the operator circuit when the operator is manually locked and the cam on the manual lock shaft has closed the bypass switch, the motor will unlock the manual lock.

*Example I*

Using the form of the invention shown in Figure 1 of the drawings, the person operating valve 11 turns on the power to motor 1. Motor 1 will rotate gear trains 2, 4–9 so that valve 11 opens. At the same time, gear 9 will rotate spring motor 15 so as to store energy in spring motor 15. When gate 12 of valve 11 reaches its full open position, or just before it reaches its full open position, limit switch 31 operates to shut off the power to motor 1 and to supply power to brake solenoid 17, thereby holding the valve 11 open by means of brake 20. When the power supply to solenoid 17 is cut off, spring motor 15 will close valve 11. When valve 11 reaches the full close position, motor 1 will continue rotating until its momentum is dissipated if the clutch shown in Figure 3 is provided between gear 4 and gear 5 of Figure 1. In case governor 63 is provided on shaft 3, the governor 63 will regulate the rate at which spring motor 15 closes valve 11.

*Example II*

The operation of the form of the invention shown in Figure 2 of the drawings is similar to the operation described in Example I. Several refinements are included which are not found in the form shown in Figure 1. A spring brake, indicated at 55, is provided instead of brake 20 of Figure 1. The limit switch mechanism is modified as shown at 41, 42, 43 of Figure 2. The gear ratio is higher. The overriding clutch 22 is in a different location. In Figure 2, the person operating the valve 11 turns on the power to motor 1, which drives gear train 32–42 to open the valve 11. At the same time, gear 40 causes spring working bushing 44 of spring motor 15 to rotate and to backwind spring 15 from storage bushing 45 onto spring working bushing 44, thus storing energy in the spring motor. When gate 12 of valve 11 reaches its full open position, or just before it reaches its full open position, limit switch 31 operates to shut off the power supply to motor 1 and to turn on the power supply to brake solenoid 59 of Figures 6 and 7, thereby holding valve 11 open as long as power is supplied to the circuit. When power to solenoid 59 is cut off, spring motor 15 closes valve 11. Overriding clutch 22 and governor 63 function the same as in Example I.

Any of the improvements shown in Figure 1 may be used in the form of the invention shown in Figures 2, 7, 8 and 9, and vice versa. This invention is not limited to the forms shown and described, since other forms will be apparent to persons skilled in the art, and these forms are also within the purview of this invention. As stated heretofore, the valve operator may be made so that the motor either opens or closes the valve, and so that the spring motor either closes or opens the valve. The brakes and clutches described may be provided at different locations in the mechanism. A variety of limit switch arrangements are possible. A number of electrical control circuits may be used, depending on the particular installation and the type of motor used.

I claim:
1. A device for opening and closing a valve of the type having a non-rising rotating stem in which the valve is opened and closed by suitable rotation of the stem in opposite directions, comprising a motor including a gear carried on the shaft thereof, a gear carried on the stem of the valve, a train of gears operably interconnecting said motor shaft gear and said valve stem gear, a spring motor having a drive shaft and including a gear carried on one end of said drive shaft and operably engaging a gear of said train of gears, a manual shaft turning means carried at the opposite end of said spring motor drive shaft, a releasing clutch intermediate said train of gears and disposed in said train of gears between said gear thereof engaged with said spring motor drive shaft gear and said gear thereof engaged with said motor shaft gear, and releasable brake means intermediate said train of gears and disposed in said train of gears between the gear thereof engaged with said motor shaft gear and said clutch; said motor operating in one rotational direction to drive said train of gears and said valve stem in one rotational direction; said spring motor storing rotational energy while said motor is operating in said one rotational direction and operating in the opposite rotational direction to drive said train of gears and said valve stem in the opposite rotational direction; said brake means when not released holding said motor, spring motor, train of gears, and valve stem stationary against rotation in said opposite direction by said spring motor after said motor has operated; said clutch permitting overriding rotation of said motor shaft in said opposite rotational direction after said spring motor has operated and the rotation of said valve stem in said opposite rotational direction is complete.

2. The combination of claim 1, said spring motor being a constant-torque spring motor, and including means for engaging said brake means when rotation of said valve stem in said one rotational direction is substantially complete and for releasing said brake means when said spring motor begins operating.

3. A device for rotation and counter-rotation of an axially stationary shaft, comprising, a motor including a gear carried on the shaft thereof, a gear carried on said axially stationary shaft, a train of gears operably interconnecting said motor shaft gear and said axially stationary shaft gear, a spring motor having a drive shaft and including a gear carried on one end of said drive shaft and operably engaging a gear of said train of gears, a manual shaft turning means carried at the opposite end of said spring motor drive shaft, a releasing clutch intermediate said train of gears and disposed in said train of gears between said gear thereof engaged with said spring motor drive shaft gear and said gear thereof engaged with said motor shaft gear, and releasable brake means intermediate said train of gears and disposed in said train of gears between the gear thereof engaged with said motor shaft gear and said clutch; said motor operating in one rotational direction to drive said train of gears and said axially stationary shaft in one rotational direction; said spring motor storing rotational energy while said motor is operating in said one rotational direction and operating in the opposite rotational direction to drive said train of gears and said axially stationary shaft in the opposite rotational direction; said brake means when not released holding said motor, spring motor, train of gears, and axially stationary shaft stationary against rotation in said opposite direction by said spring motor after said motor has operated; said clutch permitting overriding rotation of said motor shaft in said opposite rotational direction after said spring motor has operated and the rotation of said axially stationary shaft in said opposite rotational direction is complete.

4. The combination of claim 3, said spring motor being a constant-torque spring motor, and including means for engaging said brake means when rotation of said axially stationary shaft in said one rotational direction is substantially complete and for releasing said brake means when said spring motor begins operating.

References Cited in the file of this patent
UNITED STATES PATENTS

| | | |
|---|---|---|
| 2,052,918 | Branche | Sept. 1, 1936 |
| 2,052,947 | Shivers | Sept. 1, 1936 |
| 2,052,987 | Persons | Sept. 1, 1936 |
| 2,609,192 | Lermont | Sept. 2, 1952 |
| 2,746,318 | Benjamin | May 22, 1956 |